United States Patent [19]

Kaye et al.

[11] Patent Number: 6,161,999
[45] Date of Patent: Dec. 19, 2000

[54] TOGGLE BOLT DEVICE

[75] Inventors: Gordon E. Kaye, Garrison; Nathaniel H. Garfield, Purchase, both of N.Y.

[73] Assignee: Mechanical Plastics Corp., Elmsford, N.Y.

[21] Appl. No.: 09/240,407

[22] Filed: Jan. 29, 1999

[51] Int. Cl.$^7$ .................................................. F16B 21/00
[52] U.S. Cl. ........................................... 411/344; 411/346
[58] Field of Search ..................................... 411/340, 342, 411/344, 345, 346, 908

[56] References Cited

U.S. PATENT DOCUMENTS

| | | | |
|---|---|---|---|
| 4,043,245 | 8/1977 | Kaplan | 411/346 |
| 4,286,497 | 9/1981 | Shamah | 411/345 X |
| 4,294,156 | 10/1981 | McSherry et al. | 411/344 X |
| 4,650,386 | 3/1987 | McSherry et al. | 411/344 X |
| 4,943,253 | 7/1990 | Smith | 411/342 |

*Primary Examiner*—Neill Wilson
*Attorney, Agent, or Firm*—Graham & James LLP

[57] ABSTRACT

An improved fixed positionable toggle bolt device for fastening objects to a substrate comprising a metal anchor member having a nut portion and a selectively frangible positioning and holding assembly engaged with the metal member. The assembly comprises two elongated control legs, with the first ends of the control legs being pivotally attached to the metal member. The second ends of the control legs are movably attached to each other by an elongated undercut element interference, with movement of one leg relative to the other, effected by finger tip sliding, causing the metal anchor member to pivot from substantially in line with an insertion aperture in the substrate, to a position parallel to the substrate when the second ends of the control legs are aligned with each other. A positioning collar is engaged with both legs, holding them in place and is movable along the respective lengths of the legs. The legs are arcuate in cross section with a series of axially extending closely spaced rib-like teeth within the arcuate concavity. The collar is adapted to conform to the arcuate concavity together with a step tooth section to provide a one way ratchet with the legs. Once the metal member is positioned behind the substrate and abutted thereto the collar is ratcheted to a snug fit with the substrate and the legs are broken off to thereby fix the anchor in place.

5 Claims, 5 Drawing Sheets

TOGGLE BOLT DEVICE

FIELD OF THE INVENTION

This invention relates to toggle bolt type anchors and particularly to fixed position toggle bolt type anchors with position manipulating assemblies.

BACKGROUND OF THE INVENTION

In U.S. Pat. No. 4,650,386, assigned to the assignee of the present invention, a commercially available articulable positioning anchoring device is described which is a fixed position toggle bolt, i.e., wherein the anchor device is manipulated and fixed into position prior to placement of a bolt and the object to be anchored. The disclosure of said patent is included herein by reference thereto. This prior art device comprises a metal anchoring element in the form of a U-shaped channel with a centrally located raised and threaded aperture for engagement with an inserted bolt. The metal anchoring element is manipulated into position against a non-directly accessible wall or substrate surface, by means of frangible legs made of a material such as polystyrene which are provided with a series of axially extending tooth-like protuberances. These teeth define the various selected points of breakage and provide a ratchet structure for operation as will be described.

A first end of each of the manipulating legs is provided with two opposite, laterally extending, small protrusions which are adapted to be rotatably fitted into apertures formed in the upright portion of the U-shaped metal anchoring element. The nut aperture is situated between the so-connected legs, whereby passage of a bolt is possible between the legs. With this connection between the legs and the U-shaped metal anchor element, the metal anchoring element is controllably swivelable relative to the legs, between a perpendicular or axial position to substantially coextensive with the legs. Thus, during use, an aperture sufficient in diameter to accommodate the small end of the metal anchoring element is made in the substrate, and the metal anchoring element is swiveled, by control of the legs into the coextensive position.

The other ends of the legs are formed into manipulating handle elements and, in the embodiment shown in said patent, the legs are connected to each other with a slidable connection whereby sliding one leg relative to the other causes the metal anchoring element to swivel, as described.

In use, the metal anchoring element is inserted into the aperture and when it clears the opposite side is caused to assume a perpendicular position by alignment of the manipulating handles of each of the legs. The anchoring element is then drawn into contact with the distal or blind side of the substrate by pulling of the handle elements in a direction away from the substrate. A sliding collar member, initially fitted onto each of the legs, adjacent the handle elements, is made to slide up the legs (i.e., pushed) to a position whereby the substrate is snugly sandwiched between the anchoring element and the collar. The portions of the legs between the collar and anchoring element, in conjunction with the connected collar and anchoring element, provide a locked structure which serves to maintain the anchor in position even without an inserted bolt. When the collar is positionally snugged, the residuals of the legs are broken off and discarded.

In order to maintain and lock the collar in the snugged position and to provide a variable position emplacement, the legs are provided with a continuous range of axially or laterally extending tooth like protrusions (i.e., beveled teeth which widen in thickness towards the anchoring element) and the collar is internally provided with a step engagement elements which ride over the teeth of both legs in a one way direction, in the manner of a ratchet engagement. Movement of the collar is accordingly locked in the one way direction and the collar cannot easily be backed down the leg. Breakage off of the excess portion of the legs is at a base of a tooth with the widened upper end of the tooth locking the collar in place.

Despite its utility and widespread popularity there are however several disadvantages with the anchor of the prior art. Firstly, the teeth, for effective operability, protrude with relatively sharp edges and for some users this may be irritating to the fingers upon breakage of the legs. Secondly, because of the need to maintain frangibility, the legs are perforce thin and, as a result, may, on standing or improper storage, tend to warp or become misshapen. The legs may also become somewhat elastic which thereby increases an effort required for the breakage thereof. Finally, movement of the collar along the beveled teeth is somewhat difficult with resistances being involved in the collar tooth riding up the bevel and past the step engagement element.

SUMMARY OF THE INVENTION

It is accordingly an object of the present invention to provide a fixed position anchoring device wherein deployment thereof is made easier and wherein integrity of the device after storage and or extended time, prior to initial use, is enhanced.

It is a further object of the present invention to provide said anchoring device with means for reducing incidence of finger irritation and cutting, enhancing manipulation including reducing effort of collar movement and leg manipulation, and strengthening of legs to enhance both frangiblity and maintenance of structural integrity.

Generally the present invention comprises an improved fixed positionable toggle bolt device for fastening objects to a substrate. The device comprises a linear elongated metal member (which may be U-shaped, flat, or otherwise shaped depending on structural and holding strength requirements), having an integral threaded nut portion and a selectively frangible positioning and holding assembly engaged with the metal member. The holding assembly comprises at least one frangible positioning leg for use in inserting the metal member into an aperture in a substrate and in positioning the metal member against the distal side of the substrate. An anchor with one leg is usually operable with a gravity-drop positioning, whereas at least two legs are needed for utilization with a fully controlled mechanical seating.

In all embodiments, the holding assembly further comprises a one way movable collar adapted to be engaged with the at least one positioning leg and movable in a direction, along said at least one leg, toward fixed seating against the aperture and wherein an excess portion of the positioning leg which extends away from the seated collar is adapted to be broken off and removed (or otherwise moved out of the way).

In accordance with the present invention, each of said at least one leg is arcuate in cross section with a series of axially extending closely spaced rib-like arcuate teeth contained within an arcuate concavity of said at least one leg. The collar engaged thereto is adapted to conform to the arcuate concavity together with a corresponding arcuate step tooth section to provide a one way ratchet with the rib-like teeth.

The above and other objects, features, and advantages of the present invention will become more evident from the following discussion and drawings in which:

SHORT DESCRIPTION OF THE DRAWINGS

DETAILED DESCRIPTION OF THE INVENTION

Figure 1:
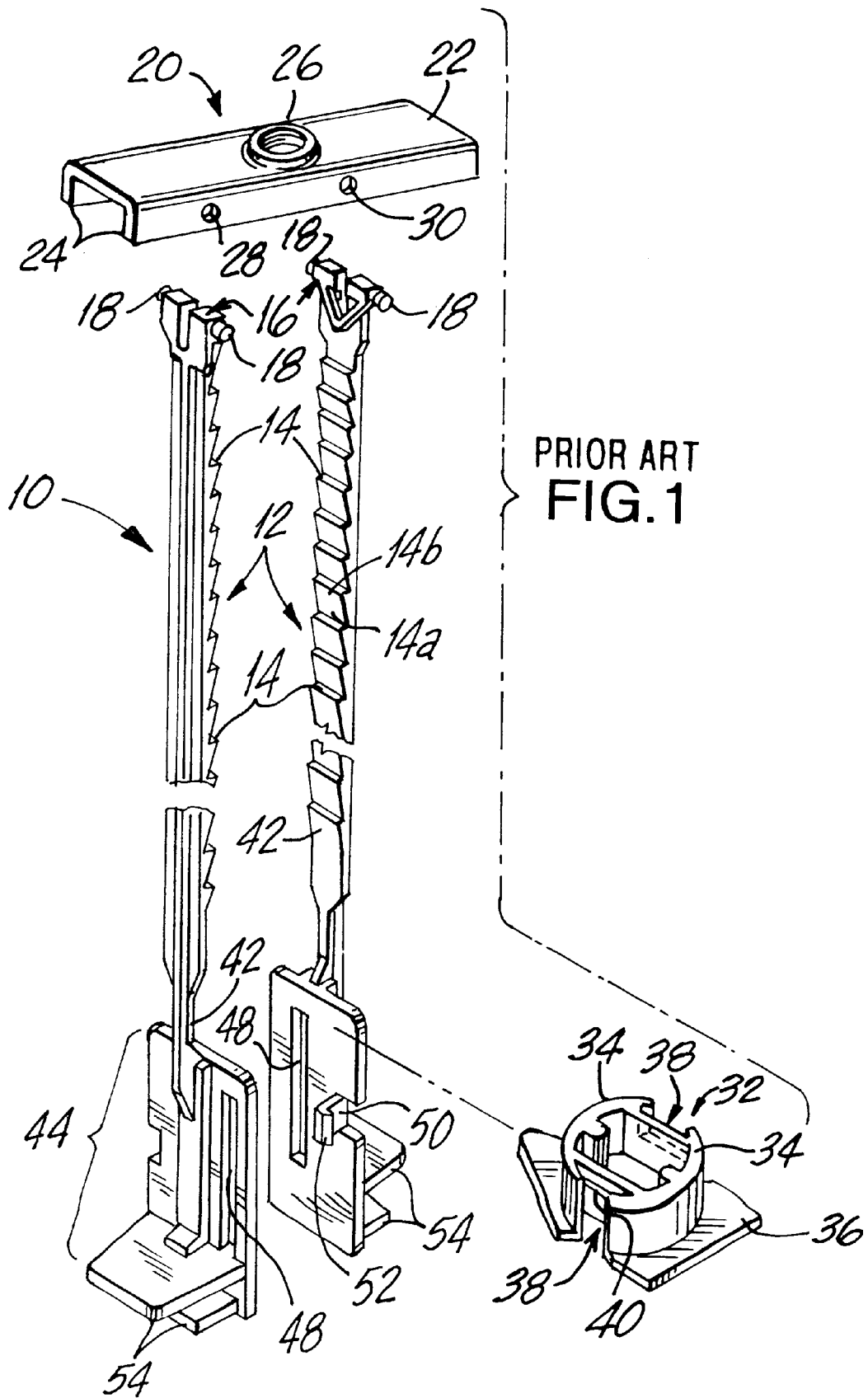
FIGS. 1 and 2 are respective exploded isometric views of the positioning anchors of the prior art and of the present invention.

The arcuate shape of the legs provides at least three advantages. Firstly, with the teeth being contained within the concavity of the arcuate leg, contact of a user's fingers therewith and possible irritation is minimized. In addition, the arcuate shape provides rigidity and structural integrity to the legs and maintains the requisite frangibility. Furthermore, contrary to expectations, the interfacial movement between the arcuate rib-like teeth and the corresponding step tooth of collar, is rendered easier despite the nominally greater interfacial surface therebetween (a curved tooth is longer than a flat tooth traversing the same width), i.e., the collar is easier to slide along the leg than with prior art planar legs, despite the increase in area of both the step tooth and arcuate teeth and concomitant increased interfacial contact. Accordingly, even a user's fingertips alone are effective for use in manipulating and installing the anchor. It has been discovered that sliding movement of the collar on the leg tends to bow out the central concave section of the leg away from the interfacial contact (with resistance to forward movement being thus only at the interface at the limited area ends of the arcuate teeth and the step tooth). However, there is a full arcuate area seating between the teeth of the leg and the step tooth of the collar, which resists backing off of the collar from the leg or legs.

In a preferred embodiment, the assembly comprises two elongated control legs (as in the above described patent), with the first ends of the control legs being pivotally attached to the metal anchor member adjacent the threaded nut portion and on opposite sides thereof. The second ends of the control legs are movably attached to each other such as by an elongated undercut element interference, whereby longitudinal movement of one leg relative to the other, effected by fingertip sliding, causes the metal member to pivot from substantially in line with an insertion aperture in the substrate, to a position parallel to the substrate when the second ends of the control legs are aligned with each other.

In accordance with the preferred embodiment of the present invention, the legs are arcuate in cross section with an outer convex surface and an inner concavity (the inner concavity of the legs face each other) with a series of axially extending closely spaced rib-like teeth within the arcuate concavity. The collar is adapted to conform to the arcuate concavity together with a step tooth section to provide a one way ratchet with the legs. Once the metal member is positioned behind the substrate and abutted thereto the coller is ratcheted to a snug fit with the substrate and the legs are broken off to thereby fix the anchor in place. The arcuate configuration of the legs provides added strength, stability and rigidity in the prevention of warpage and deformation over time and the requisite breakage is readily effected with the break being very clean and even.

In the embodiments utilizing at least two legs, it is preferred that the legs be identical, with each having sliding engagement undercut structural elements which are offset to one side (relative to a longitudinal axis of the anchor), whereby, when the legs are placed in a facing position, the undercut structural element of one slidingly engages with the other by being positioned either above or and underneath the other. The extent of swivel permitted by the engagement of the other end of the legs with the metal anchor member limits the relative sliding travel between the undercut elements.

The preferred material for the legs is high density polystyrene which has good tensile strength and is readily frangible when required, as described. In addition, polystyrene is very smooth with a low coefficient of friction and, as a result, sliding movement between the undercut structural element requires minimal effort. Accordingly, in a preferred embodiment, the surface of the legs opposite their sliding interconnection is serrated (or otherwise made less smooth) and slightly indented for engagement with a user's fingertips (e.g., thumb and forefinger) which are sufficient by simple relative parallel sliding motion, to readily effect the controlled swiveling movement of the anchoring element.

DETAILED DESCRIPTION OF THE DRAWINGS AND THE PREFERRED EMBODIMENT

Figure 4:
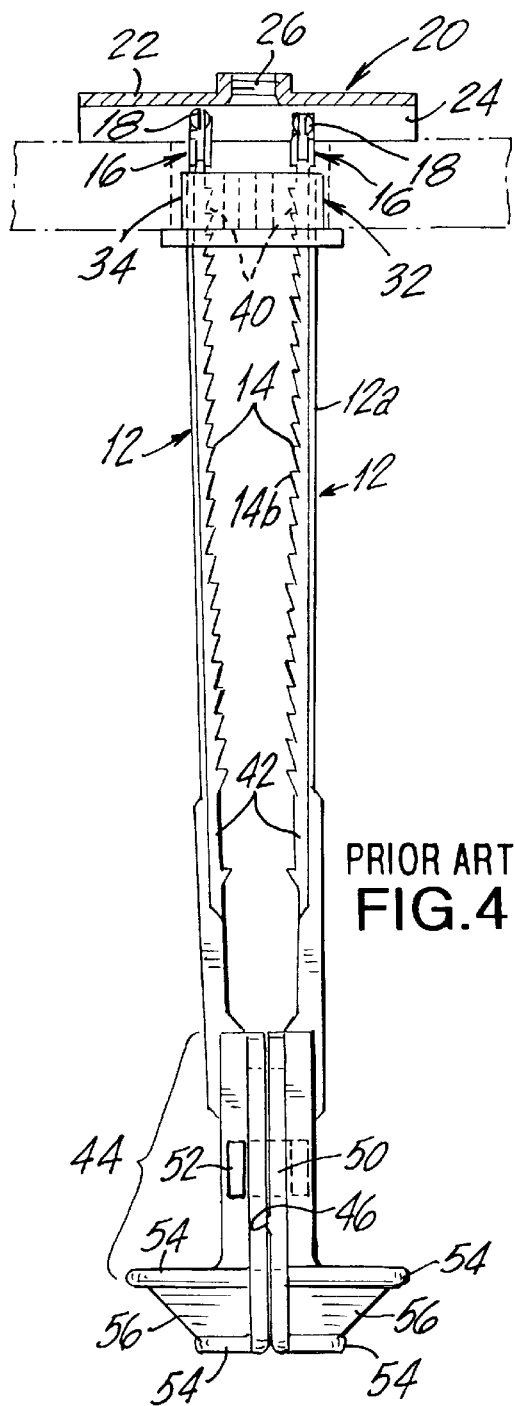
FIGS. 4 and 5 are respective side views of the anchors of FIGS. 1 and 2 being deployed against a substrate with ratcheted movement of the collar member.

With specific reference to the drawings, prior art anchor 10 is shown in FIG. 1 with metal anchoring element 20, positioning legs 12 and collar 32. FIG. 4 depicts the fully constructed anchor 10 as being deployed in a substrate 100 with collar 32 having been pushed into engagement with a surface of the substrate 100. During the deployment of the collar, the collar is ratcheted along integral teeth 14 of legs 12 via step tooth elements 40. Teeth 14 have narrow bases 14a and widened tops 14b to permit one-way movement along the bevel of the tooth, with engagement between teeth 40 and the upper beveled ends 14b preventing backward movement of the collar (i.e. locking it into position when it engages the substrate surface). The excess portion 12a of legs 12 is broken off at the intersection between the legs and the outer surface of the collar 32. This break is conveniently effected by insertion of a user's thumb or other fingers between the legs 12 and a rocking side to side motion which causes the legs 12 to pivot and break at the aforementioned intersection. While the anchor is fully operable as shown, a user's fingers come into contact with the teeth 14 during the breaking procedure with possible resultant irritation.

Figure 2:
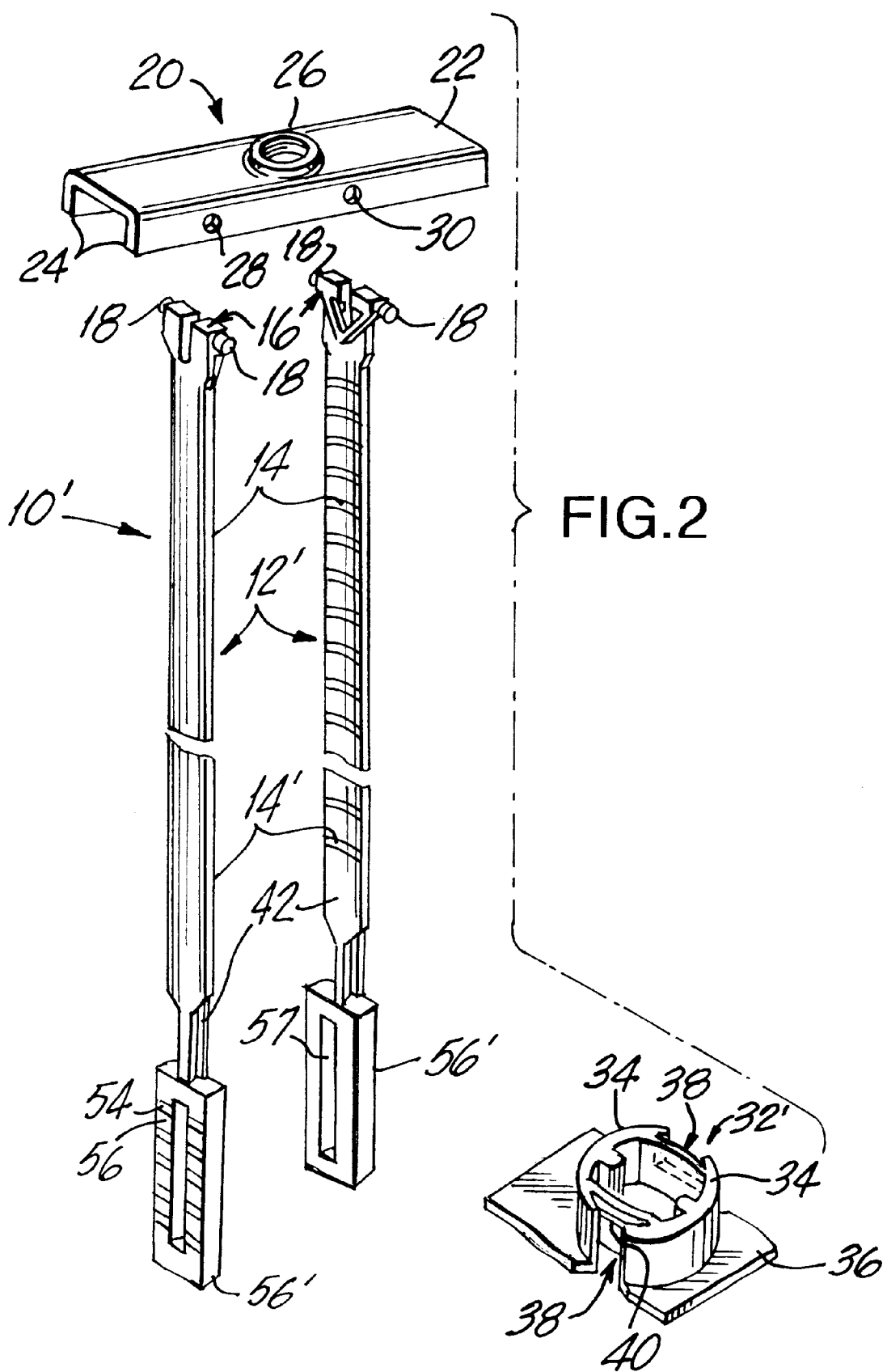
Figure 5:
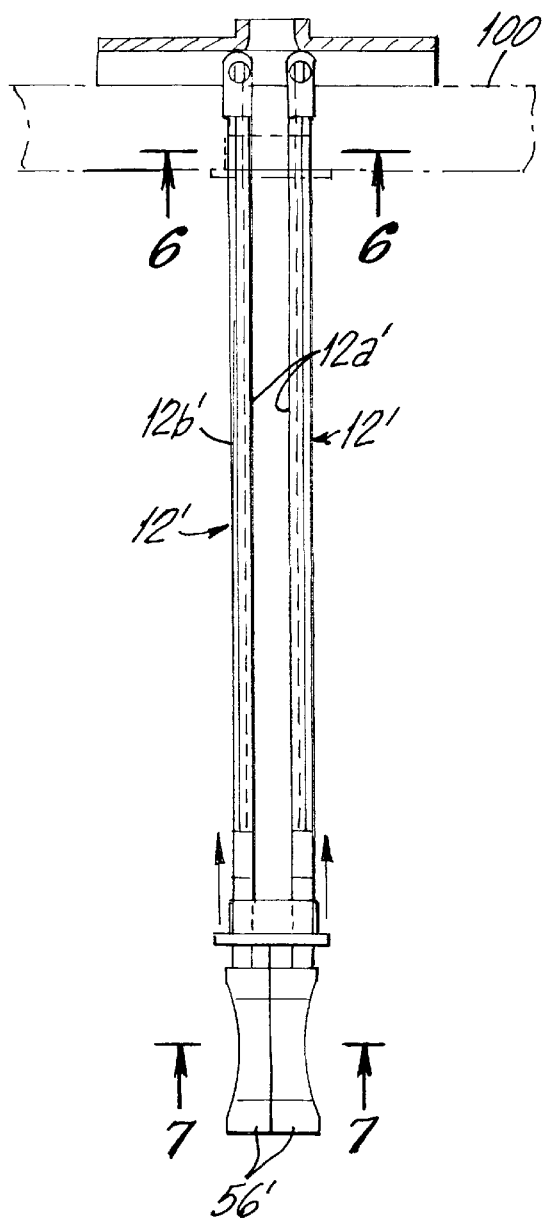

As shown in FIGS. 2 and 5, the anchor 10' of the present invention comprises similar legs 12' (each of the legs 12' being identical to the other), the same metal anchoring member 20 and a similar collar 32'. The anchors (prior art and that of the present invention) differ in the structure of the legs 12' and the accommodating portions of collar 32'. Legs 12' are arcuate or curved in cross section, with a concavity 12a'. The concavities 12a' of the two legs shown in FIGS. 2 and 5 face each other in the constructed anchor as more clearly shown in FIG. 2. From FIG. 5, it is evident that the teeth 14' do not extend beyond the concavity. The legs have an outer convex surface 12b'.

Arcuate teeth 14' extend along the concave surface 12a' and with such position are recessed and not in a position to contact a finger used to break the legs during placement, as shown in FIG. 5.

Figure 3:
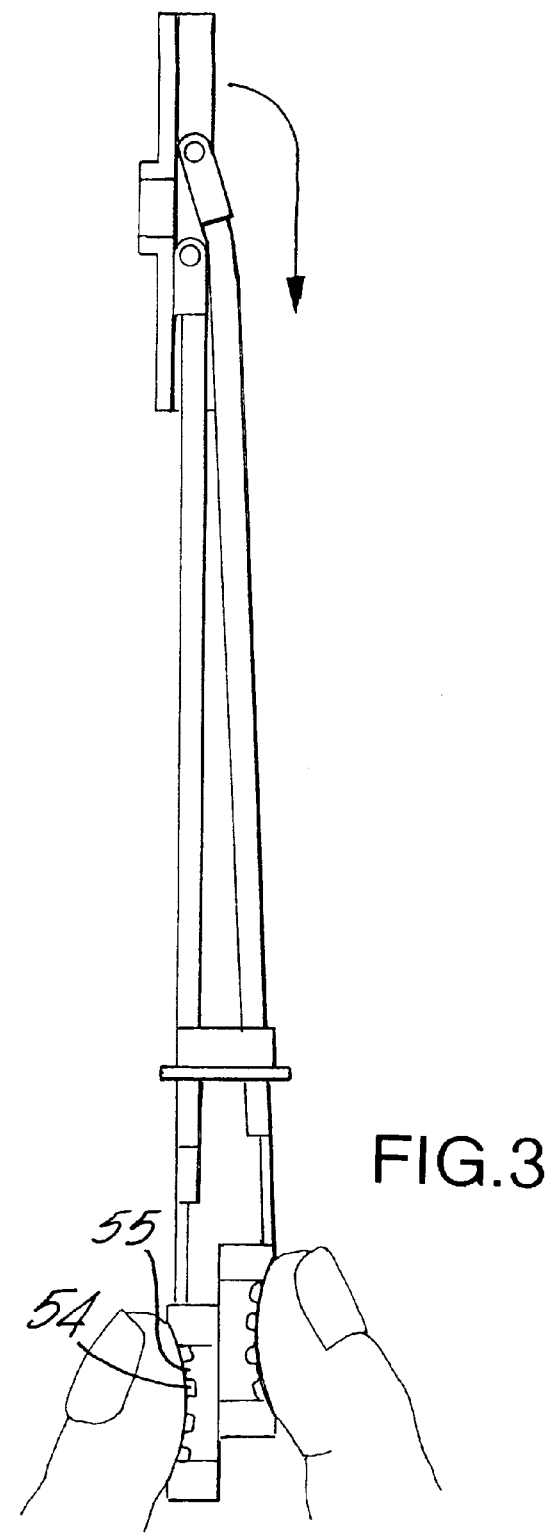
FIG. 3 illustrates the fingertip control of the swiveling of the metal anchoring element by manipulation of the handle sections of the anchor of FIG. 2.

During use, the legs of anchor 10' are manipulated as shown in FIG. 3, with fingertip manipulation (in a rubbing motion) of handle elements 56' being sufficient to effect movement of the legs 12' and thereby causing metal anchoring member 20 to move from a position axial or perpendicular to the legs (FIG. 3) to a position shown in FIG. 3, in line with the legs and suitable for insertion into a hole in substrate 100 for deployment of the anchor as shown in FIG. 5. In such deployment the handles are returned to their aligned position as in FIG. 3 and pulled and held between the manipulating fingers as the other hand is used to move the collar 32' along the legs to the position shown in FIG. 5.

The handle elements 56' are each simply configured as rectangular block, which are widened relative to the legs integrated therewith and are dimensioned (about 13 mm width and 25 mm length) to comfortably provide a base for finger engagement. Shallow indentations 54 and ribs 55 enhance the finger engagement against slippage and provide an additional measure of sure control.

Figure 7:
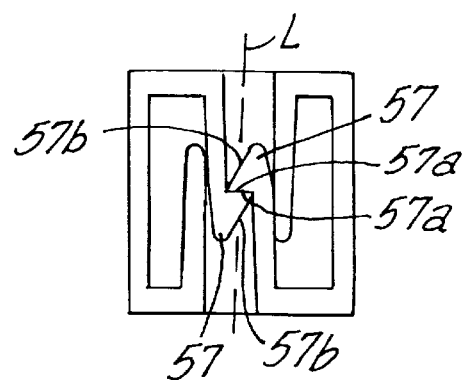
FIG. 7 is a cross section view of the engagement of the undercut elements of the legs forming the anchor of FIG. 5, taken along line 7—7.

As shown in FIGS. 2 and 7, movement and engagement between the handle elements 56' is effected by means of offset internal extension elements 57 which extend inwardly (i.e., toward the other leg when the legs are positioned as shown) and longitudinally continue along a major portion of the length of the handles. The extension elements 57, are each identically offset from the central longitudinal axis L of the handle and are provided with laterally extending terminal ledges 57a which are positioned and dimensioned to be slidingly engaged with each other when the legs are juxtaposed in the constructed configuration shown in FIG. 5 wherein the extensions and ledges are mirror image off-set from the longitudinal axis of the anchor. The longitudinal length of the extension elements are at least sufficient to permit sufficient relative movement of the handles to effect manipulating swiveling of the metal anchoring from alignment with one side of the legs shown in FIG. 3 to alignment with the other side of the legs as shown by the directional arrows.

If, during construction, the legs are first attached to the metal anchoring member 20, then engagement between the handle elements is effected by a snapping together of the extension elements 57 with the beveled sections thereof 57b permitting an undercut or overlapping engagement. Otherwise, it is alternatively possible to longitudinally slide the extension elements into such engagement and then into engagement with the metal anchoring member.

Figure 6:
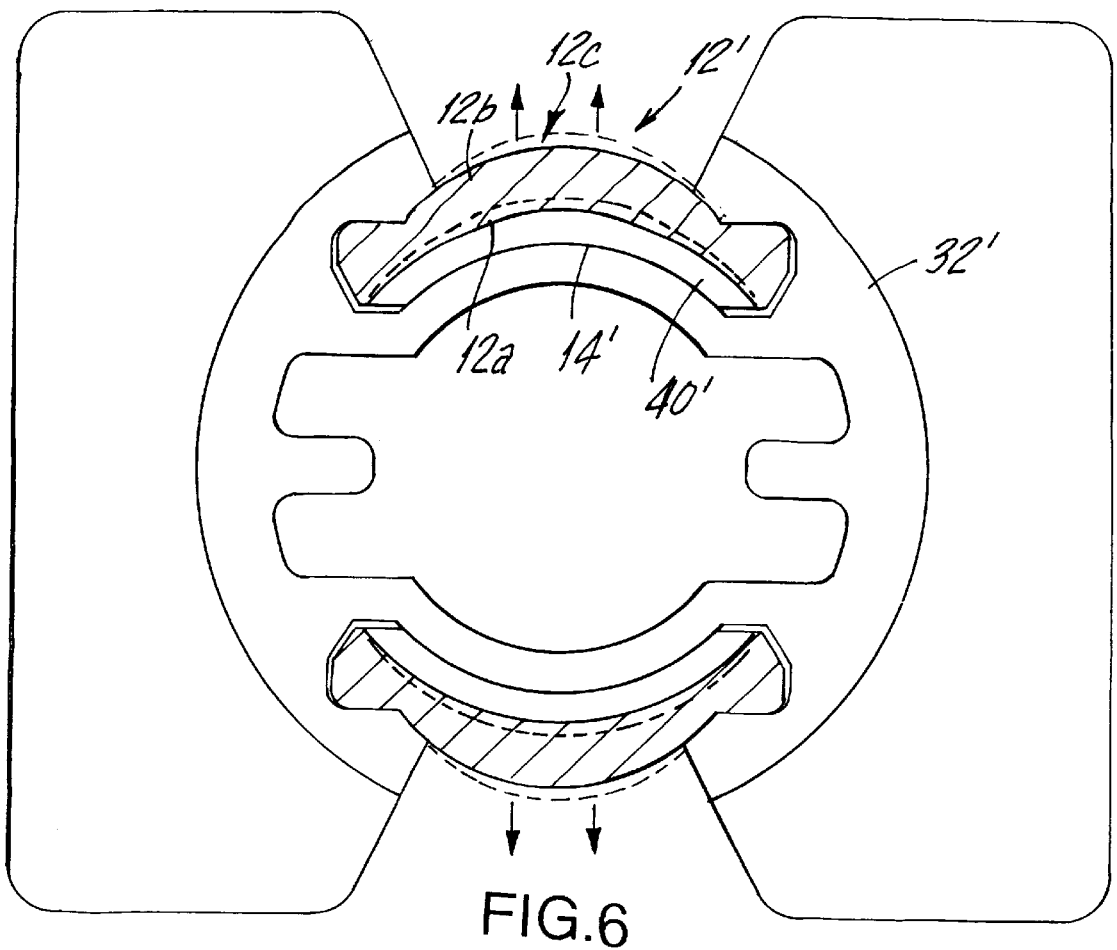
FIG. 6 is a section view showing the forward engagement of the collar in the anchor of FIG. 5 with the ratcheting legs thereof taken along line 6—6.

A factor making fingertip manipulation easily possible is the reduced effort required to ratchet the collar 32 into position against the substrate 100. As a result, fingertip holding is sufficient against the pressure of collar ratcheting to maintain the anchor against the distal side of the substrate. As illustrated in FIG. 6, forward or ratcheting engagement between the step tooth 40' of collar 32' and the arcuate teeth 14' of the legs is effected only at the respective ends since the ratcheting pressure causes the center 12c of arcuate leg 12' to slightly bow outwardly (indicated by dashed lines and directional arrows) with concomitant release of engagement between the step tooth 40' and leg teeth 14' at such central position. Such reduced engagement results in reduced ratcheting pressure. It is noted that disengagement between the respective teeth is prevented by a full arcuate engagement.

It is understood that the above description and drawings are only illustrative in nature and that changes may be made in configuration, materials, components and relative arrangement without departing from the scope of the present invention as set forth in the following claims.

What is claimed is:

1. A fixed positionable toggle bolt device for fastening objects to a substrate comprising a linear elongated metal anchoring member having an integral threaded nut portion, and a selectively frangible, positioning and holding assembly engaged with the metal anchoring member, wherein the positioning and holding assembly comprises at least one frangible positioning leg adapted for use in moving the metal member to a position substantially in line with the at least one leg for the inserting the metal member into an aperture in the substrate and for moving the metal member against a distal side of the substrate, wherein the holding assembly further comprises a one way movable collar adapted to be engaged with the at least one positioning leg and movable in a direction, along said at least one leg, toward fixed seating against the aperture and wherein an excess portion of the positioning leg which extends away from the seated collar is adapted to be broken off and removed, characterized in that each of said at least one leg is arcuate in cross section with a series of axially extending closely spaced arcuate teeth contained within an arcuate concavity of said at least one leg, wherein the collar engaged thereto is adapted to conform to the arcuate concavity together with a corresponding arcuate step tooth section to provide a one way ratchet engagement with the arcuate teeth of the at least one leg.

2. The toggle bolt device of claim 1, wherein the manipulating and holding assembly is comprised of two legs having means for the slideably movable engagement therebetween.

3. The toggle bolt device of claim 2, wherein said legs comprises means for engagement with and manipulation movement thereof for movement of the metal anchoring member device, by the fingertips of a user thereof.

4. The toggle bolt device of claim 3, wherein said arcuate legs each comprise convex and concave surfaces and wherein the concave surface of one leg faces the concave surface of the other leg and wherein the arcuate teeth of each leg axially extends across the concave surface of the respective legs.

5. The toggle bolt device of claim 2, wherein said means for the slideable engagement between the legs comprises terminal handle elements having extension elements extending from one leg to the other, wherein the extension elements of the respective legs are mirror image offset from a longitudinal axis of the device and with said extension elements comprising terminal ledges adapted to touchingly overlap with each other in a longitudinally slidable engagement.

* * * * *